(12) United States Patent
Hanmann et al.

(10) Patent No.: US 7,024,491 B1
(45) Date of Patent: Apr. 4, 2006

(54) REMOTELY SYNCHRONIZING A MOBILE TERMINAL BY ADAPTING ORDERING AND FILTERING SYNCHRONIZATION RULES BASED ON A USER'S OPERATION OF THE MOBILE TERMINAL

(75) Inventors: Jonathan Lee Hanmann, Corona, CA (US); Anil Sareen, Mission Viejo, CA (US); Kenneth J. Smith, Corona, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 775 days.

(21) Appl. No.: 09/863,572

(22) Filed: May 23, 2001

(51) Int. Cl.
*G06F 15/173* (2006.01)
*G06F 15/16* (2006.01)
*H04B 1/60* (2006.01)
*H04B 17/02* (2006.01)
*H04B 1/00* (2006.01)

(52) U.S. Cl. .................. 709/248; 709/224; 455/9; 455/70; 455/412.1

(58) Field of Classification Search ............ 709/224, 709/248; 455/9, 412.1, 70
See application file for complete search history.

(56) References Cited

U.S. PATENT DOCUMENTS

| 6,101,531 | A |   | 8/2000 | Eggleston et al. |         |
|-----------|---|---|--------|------------------|---------|
| 6,138,156 | A | * | 10/2000| Fletcher et al.  | 709/224 |
| 6,141,010 | A |   | 10/2000| Hoyle            |         |
| 2002/0087655 | A1 | * | 7/2002 | Bridgman et al.| 709/247 |
| 2002/0116472 | A1 | * | 8/2002 | Kalish et al.  | 709/218 |

FOREIGN PATENT DOCUMENTS

EP    1161047 A2 * 12/2001

* cited by examiner

*Primary Examiner*—Zarni Maung
*Assistant Examiner*—Hassan Phillips
(74) *Attorney, Agent, or Firm*—Jason T. Evans, Esq.; Howard H. Sheerin, Esq.

(57) ABSTRACT

A method and apparatus for remotely synchronizing a mobile terminal to a target computer is disclosed. A user's operation of the mobile terminal is monitored and a computer program is executed for adapting ordering and filtering synchronization rules in response to the user's operation of the mobile terminal to generate a modified set of synchronization rules. Synchronization data is exchanged between the target computer and the mobile terminal using the modified set of synchronization rules.

43 Claims, 14 Drawing Sheets

REMOTELY SYNCHRONIZING A MOBILE TERMINAL BY ADAPTING ORDERING AND FILTERING SYNCHRONIZATION RULES BASED ON A USER'S OPERATION OF THE MOBILE TERMINAL

CROSS REFERENCE TO RELATED APPLICATIONS AND PATENTS

This application is related to co-pending U.S. patent applications Ser. No. 09/863,194 entitled "MODIFYING WEB PAGE LINKS FOR DISPLAY ON A MOBILE TERMINAL TO INDICATE THE CACHE STATUS OF LINKED WEB PAGES", the disclosure of which is herein incorporated by reference.

BACKGROUND OF THE INVENTION

1. Field of the Invention

The present invention relates to mobile terminals. More particularly, the present invention relates to remotely synchronizing a mobile terminal by adapting ordering and filtering synchronization rules based on a user's operation of the mobile terminal.

2. Description of the Prior Art

Mobile terminals, such as handheld computers, cellular phones, tablet computers, etc., can be synchronized to personal information management (PIM) data, such as contacts and calendar data, as well as Internet data, such as emails and pre-selected web sites or other server based data. Updates to the data are typically synchronized between a target computer and the mobile terminal. For example, when a user updates a PIM database or downloads emails from a target computer, the database updates or new emails are transmitted to the mobile terminal during a synchronization session. FIG. 1 shows a prior art configuration for synchronizing a mobile terminal 2 to a target computer 4 over a direct, wired connection 6 (e.g., a USB connection).

If the user is away from the target computer 4, the mobile terminal 2 must be synchronized remotely. FIG. 2 shows prior art configurations for remotely synchronizing the mobile terminal 2 to the target computer 4 via the Internet 8. In one configuration, the mobile terminal 2 accesses the Internet 8 over a wired connection 10 (e.g., telephone lines) and an Internet service provider (ISP) 12. In another configuration, the mobile terminal 2 accesses the Internet over a wireless network such as a cellular provider network (CPN) 14 or a short range wireless access point (WAP) 15, such as Bluetooth, 802.11b, or Home RF. In either case the bandwidth of the communication channel is typically much less as compared to the bandwidth of the direct, wired connection as in FIG. 1, thereby increasing the latency in accessing the data as well as decreasing battery life of the mobile terminal. Further, a CPN 14 typically charges a connection fee for transmitting the synchronization data. It is therefore desirable to minimize the amount of information exchanged between the mobile terminal 2 and the target computer 4 when synchronizing remotely in order to minimize the synchronization time, conserve battery power, and minimize the connection fees. These problems are exacerbated as the mobile terminal's storage capacity increases allowing for a significant increase in the amount of synchronization data transmitted to the mobile terminal. Although the prior art has suggested various methods of filtering the synchronization data in order to reduce the synchronization time, further improvement is desirable.

FIG. 3 shows a prior art mobile terminal 16 comprising a plurality of application programs 18 for viewing and manipulating synchronized data exchanged with the target computer 4. After a synchronization session, the user typically executes one or more of the application programs 18 to view and/or manipulate the synchronized data. For example, the user may read and respond to emails downloaded from the target computer 4, and then browse web pages downloaded from the target computer 4. It is desirable to reduce the latency in accessing the synchronized data once transmitted to the mobile terminal so that the user may begin viewing and/or manipulating the synchronized data as soon as possible.

In addition, it is desirable to enhance the user's experience while browsing web sites on the mobile terminal, both on-line and off-line. Currently, off-line browsing on a mobile terminal is enabled by downloading pages from pre-selected web sites during a synchronization session. The web pages are downloaded to the mobile terminal starting with a selected web page, and following through the linked pages in the order they are encountered, until the memory allocated for the web site is exhausted. The user's ability to configure the synchronization process is very limited. For example, the user may specify a "link-depth" to limit the number of links that are followed from the starting web page. The user may also prevent the synchronization process from following links to "external" web sites. However, this limited control over the synchronization process can severely degrade the usefulness of off-line browsing since the memory allocated to a web site may be exhausted quickly before the pages of interest are actually downloaded. Even if the mobile terminal is equipped with mass storage (e.g., a disk drive), downloading every page of a web site to ensure the pages of interest are downloaded would extend significantly the synchronization process.

There is, therefore, a need to enhance the performance in transmitting information to a mobile terminal, particularly with respect to synchronizing remotely, so as to minimize access latency, conserve battery power, and minimize connection fees.

SUMMARY OF THE INVENTION

The present invention may be regarded as a method of remotely synchronizing a mobile terminal to a target computer. The method comprises the steps of providing a set of synchronization rules comprising ordering and filtering rules and monitoring a user's operation of the mobile terminal. The method further comprises the steps of executing a computer program for adapting the ordering and filtering rules in response to the user's operation of the mobile terminal to generate a modified set of synchronization rules, exchanging synchronization data between the target computer and the mobile terminal using the modified set of synchronization rules, and storing synchronized data in the local memory of the mobile terminal.

In one embodiment the method further comprises the step of displaying the synchronized data on the screen of the mobile terminal while concurrently receiving synchronization data from the target computer using the modified set of synchronization rules.

In yet another embodiment the method further comprises the step of transmitting the modified set of synchronization rules from the mobile terminal to the target computer, wherein the target computer uses the modified set of synchronization rules to configure a synchronization program executed by the target computer. In an alternative embodiment, the mobile terminal processes the modified set of synchronization rules to control the exchange of synchronization data between the mobile terminal and the target computer.

In one embodiment the synchronization data comprises a first data and a second data. The step of monitoring a user's operation of the mobile terminal comprises the step of monitoring the user's preference in viewing data. If the step of monitoring the user's operation indicates a preference for viewing the first data before viewing the second data, the ordering and filtering rules are modified such that the first data are received by the mobile terminal before the second data. For example, in one embodiment the first data comprises emails and the second data comprises web pages, and in another embodiment the first data comprises a first web page and the second data comprises a second web page.

In still another embodiment, the step of monitoring a user's operation of the mobile terminal comprises the step of identifying data of interest to the user, and the computer program adapts the synchronization rules so that web pages related to the data of interest are downloaded to the mobile terminal.

In yet another embodiment, the method further comprises the step of monitoring the user's progression through a path of linked web pages while browsing an Internet web site on-line, adapting the ordering and filtering rules based on the user's progression through the path of linked web pages, and receiving a plurality of web pages associated with the path, the web pages for display on the screen of the mobile terminal. In one embodiment, the plurality of web pages received by the mobile terminal comprises web pages linked to the path. In another embodiment, the synchronization rules comprise a link-depth identifying a maximum depth of linked pages extending from the path to include in the plurality of web pages received by the mobile terminal. In one embodiment, the user enables and disables the monitoring of the progression through the path of linked web pages.

The present invention may also be regarded as a mobile terminal for communicating with a target computer. The mobile terminal comprises a local memory for storing a set of synchronization rules comprising ordering and filtering rules, a screen, and a terminal controller. The terminal controller for monitoring a user's operation of the mobile terminal, and executing a computer program for adapting the ordering and filtering rules in response to the user's operation of the mobile terminal to generate a modified set of synchronization rules. The terminal controller exchanges synchronization data between the target computer and the mobile terminal using the modified set of synchronization rules, and stores synchronized data in the local memory.

The present invention may also be regarded as a computer program embodied on a computer readable storage medium for use in a mobile terminal, the mobile terminal comprising a local memory, a screen, and a set of synchronization rules comprising ordering and filtering rules. The computer program comprises code segments for monitoring a user's operation of the mobile terminal, adapting the ordering and filtering rules in response to the user's operation of the mobile terminal to generate a modified set of synchronization rules, exchanging synchronization data between the target computer and the mobile terminal using the modified set of synchronization rules, and storing synchronized data in the local memory.

DESCRIPTION OF THE PREFERRED EMBODIMENTS

Figure 1:
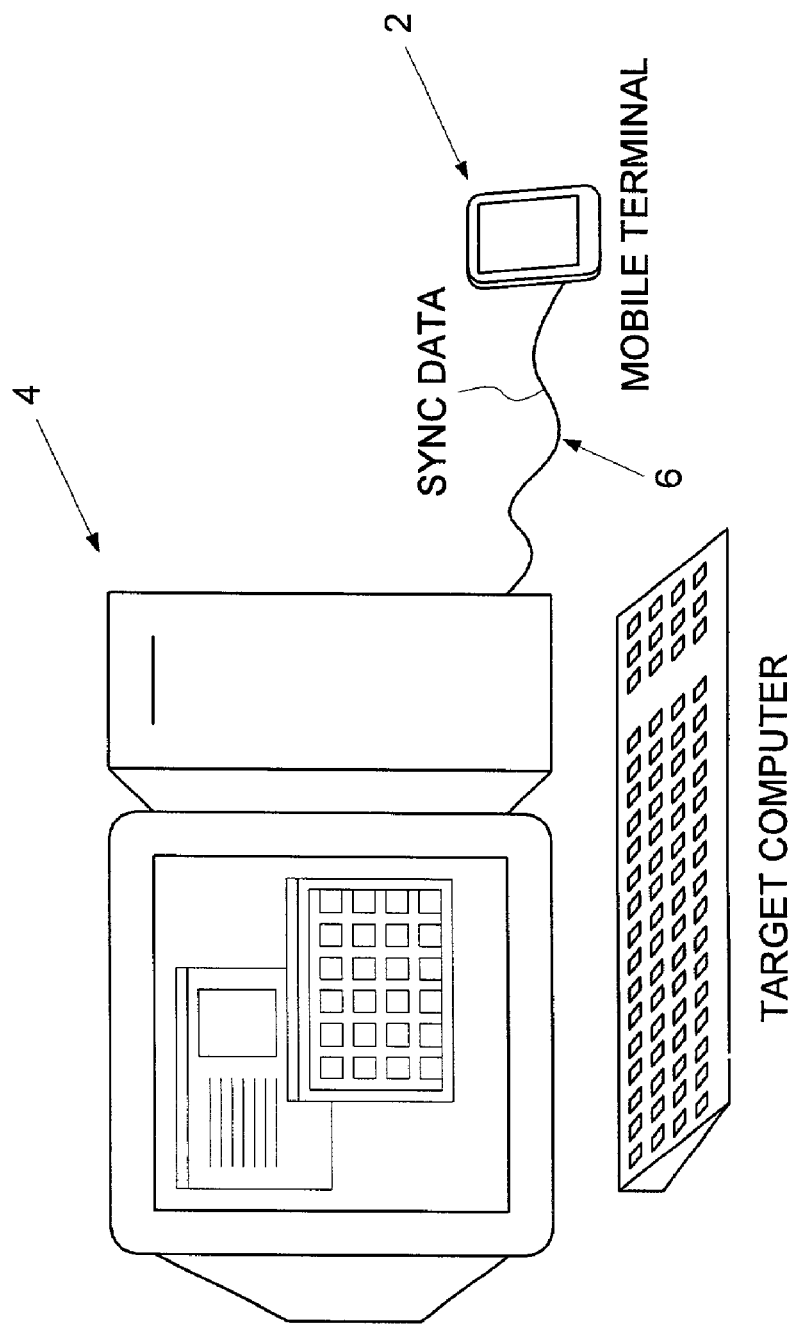
FIG. 1 shows a prior art configuration wherein a mobile terminal is synchronized to a target computer over a direct wired connection.
Figure 2:
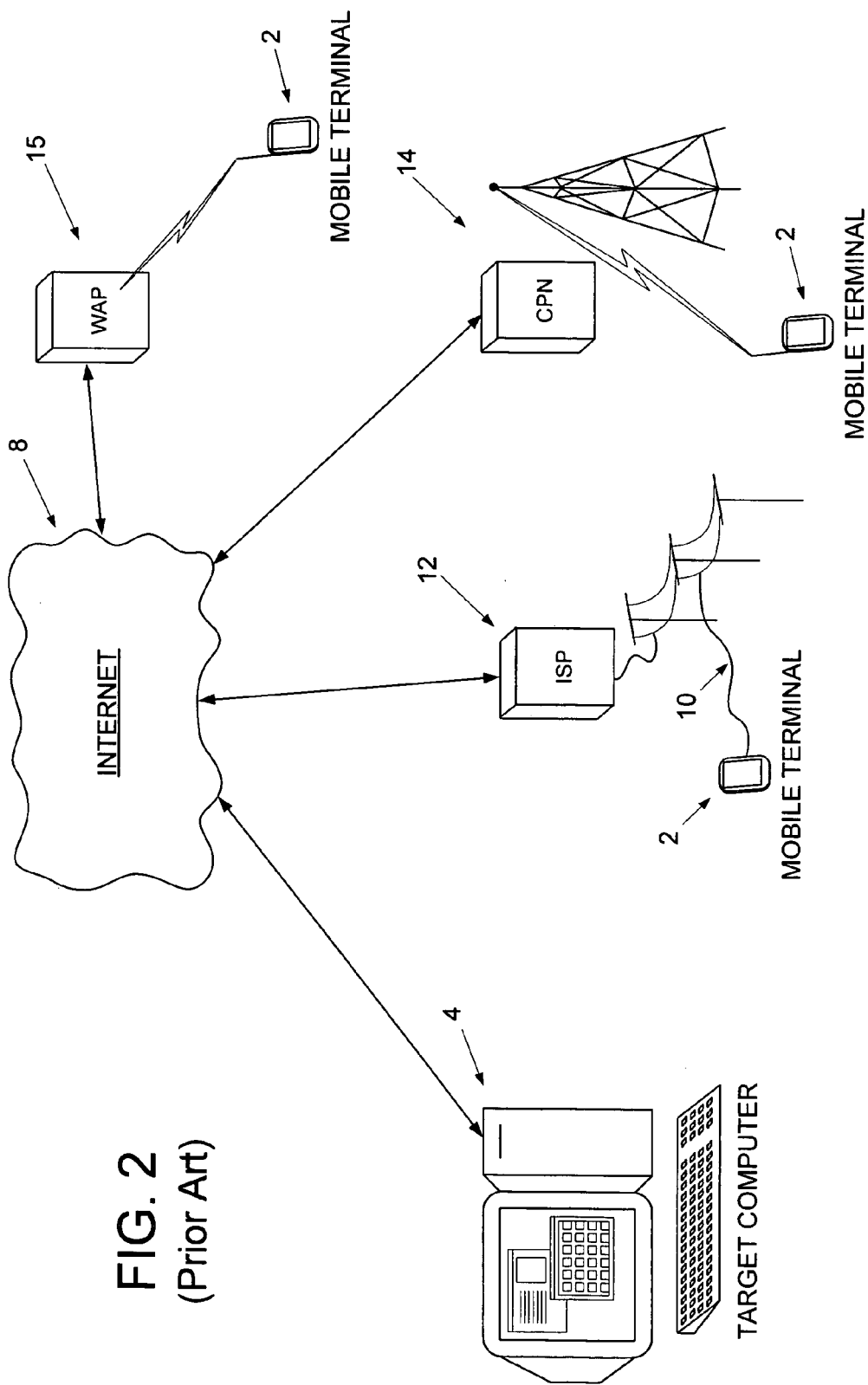
FIG. 2 shows a prior art configuration wherein a mobile terminal is synchronized remotely to the target computer over telephone land lines or over a wireless network via the Internet.
Figure 3:
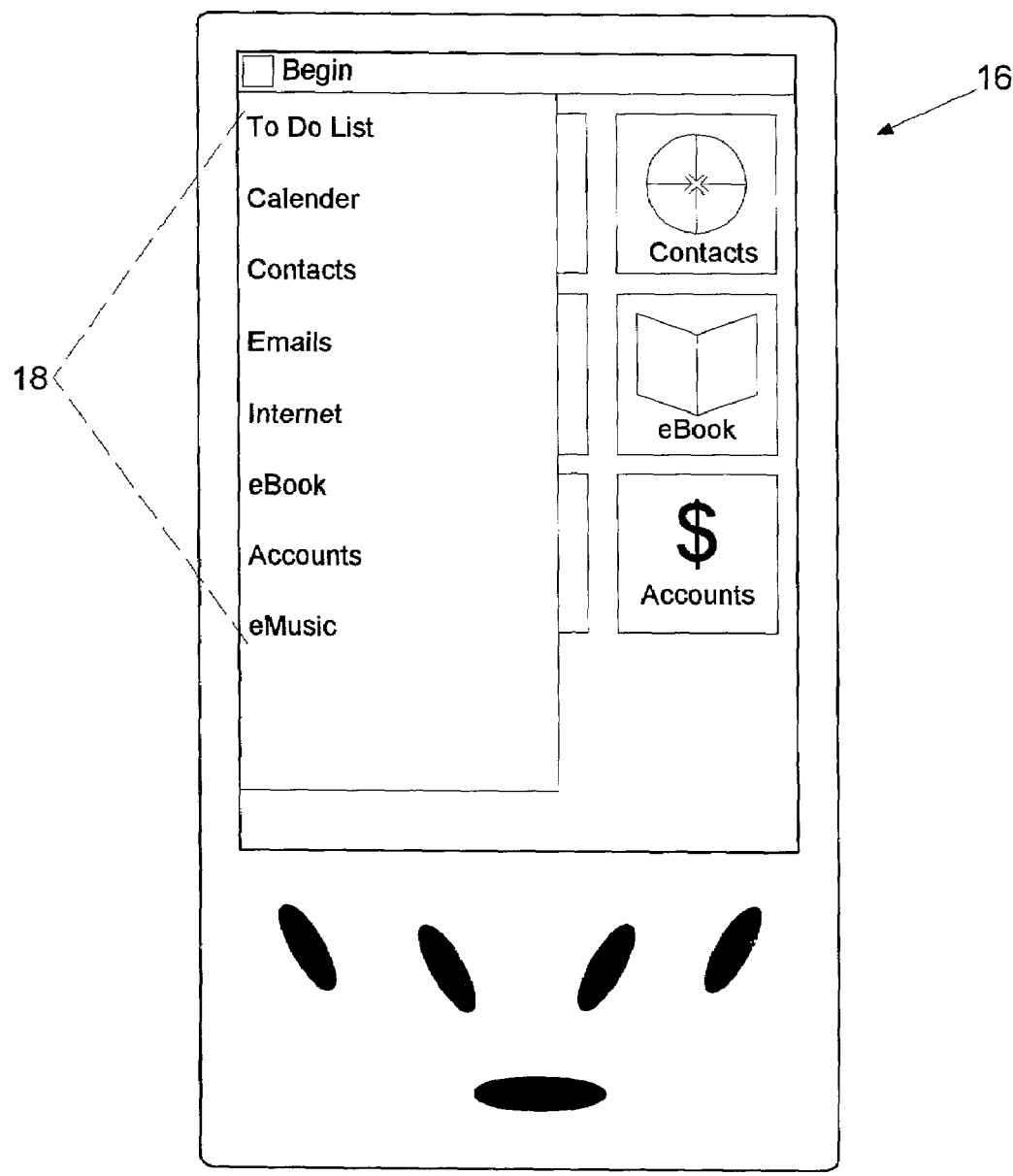
FIG. 3 shows a prior art mobile terminal comprising a plurality of application programs for viewing and manipulating synchronized data exchanged with the target computer.
Figure 4A:
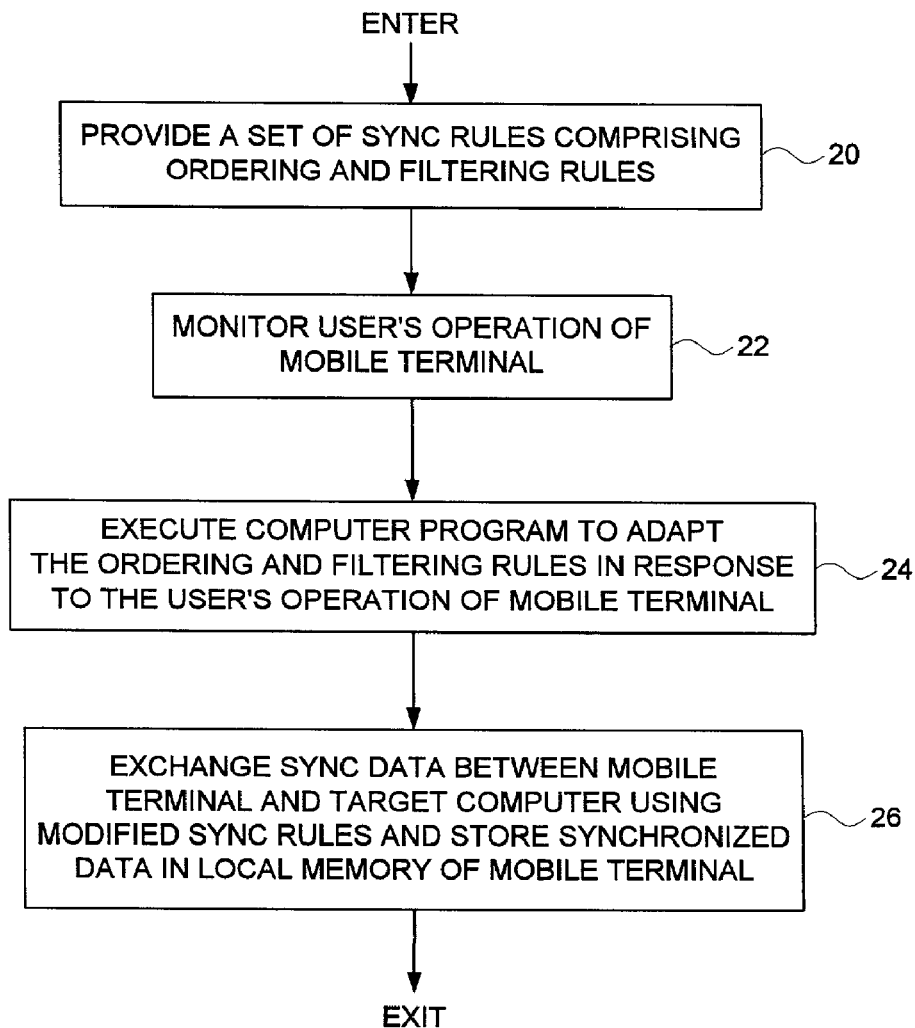
FIG. 4A is a flow chart according to an embodiment of the present invention illustrating how the user's preference in operating the mobile terminal is monitored in order to adapt the synchronization rules and optimize the synchronization process.

FIG. 4A shows a flow chart according to an embodiment of the present invention illustrating a method of remotely synchronizing a mobile terminal to a target computer. At step 20 a set of synchronization rules comprising ordering and filtering rules is provided. At step 22 a user's operation of the mobile terminal is monitored. At step 24 a computer program is executed for adapting the ordering and filtering rules in response to the user's operation of the mobile terminal to generate a modified set of synchronization rules. At step 26 synchronization data is exchanged between the target computer and the mobile terminal using the modified set of synchronization rules, and synchronized data is stored in the local memory of the mobile terminal.

Figure 4B:
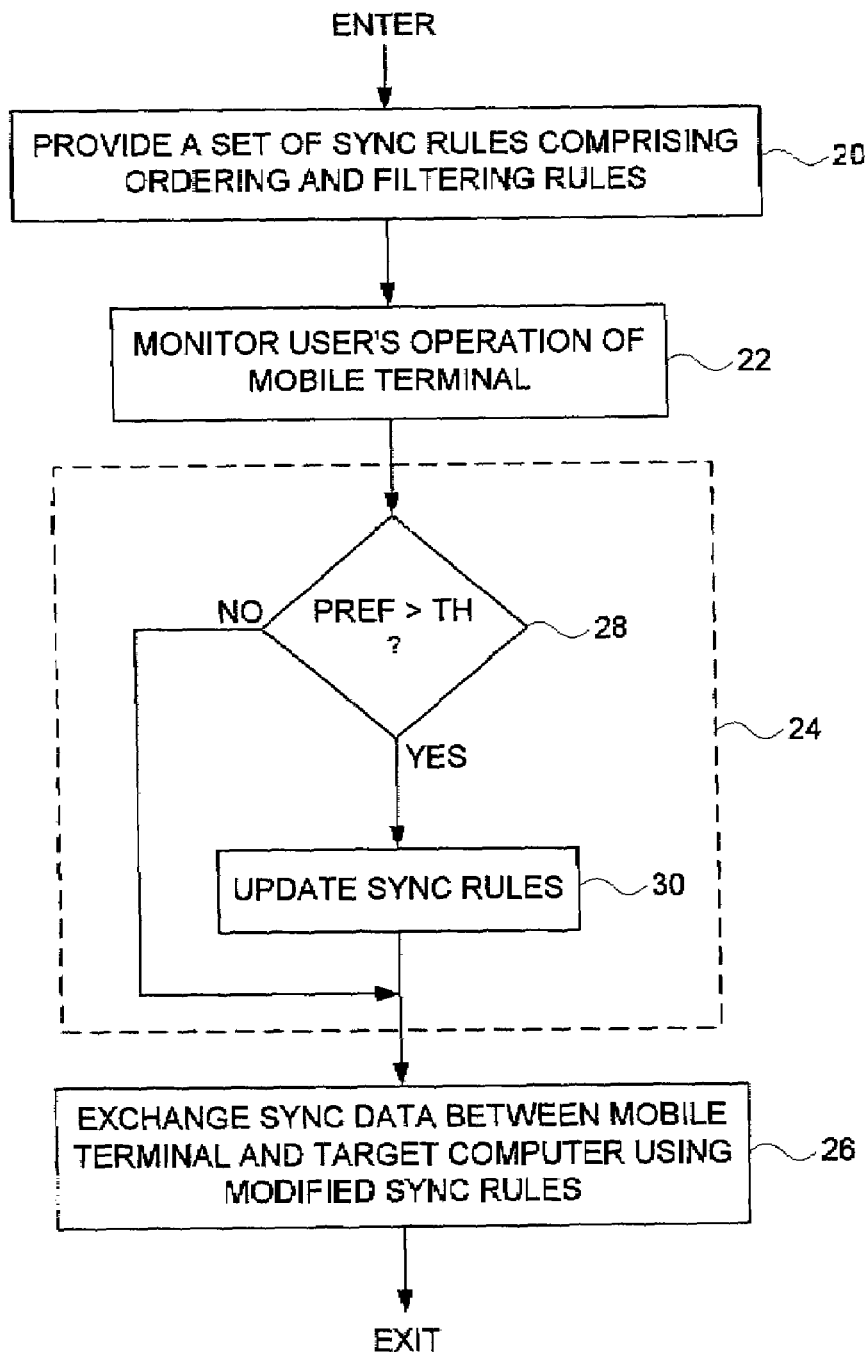
FIG. 4B is a flow chart according to an embodiment of the present invention wherein the synchronization rules are updated if the user repeats an operation a predetermined number of times.

FIG. 4B is a flow chart according to an embodiment of the present invention wherein the computer program updates the synchronization rules if the user repeats an operation a predetermined number of times (e.g., N out of M times). Step 24 of FIG. 4A comprises step 28 and step 30 of FIG. 4B. If at step 28 the user's repetition pattern exceeds some predetermined threshold, then at step 30 the computer program updates the synchronization rules to reflect the user's preference. For example, if the user prefers to view emails first 9 out of 10 synchronization sessions, then the synchronization rules are modified so that the emails are transmitted to the mobile terminal first.

In one embodiment the synchronization data comprises a first data and a second data. The step of monitoring a user's operation of the mobile terminal comprises the step of monitoring the user's preference in viewing data. If the step of monitoring the user's operation indicates a preference for viewing the first data before viewing the second data, the synchronization rules are modified such that the first data are received by the mobile terminal before the second data. For example, in one embodiment first data comprises emails and the second data comprises web pages. If the user prefers to read emails first, the synchronization rules are adapted so that the emails are received before the web pages. In another embodiment the first data comprises a first web page (e.g., stock quotes) and the second data comprises a second web page (e.g., daily news). If the user prefers to read the first web page before the second web page, the computer program adapts the synchronization rules so that the first web page is received before the second web page. This ensures the user will receive the highest priority data first in the event the synchronization connection is lost or terminated.

In one embodiment the synchronized data may be displayed on the screen of the mobile terminal while concurrently receiving synchronization data from the target computer. For example, the user may view and draft responses to new emails received from the target computer while the target computer continues to transfer other synchronization data, such as updated web pages. This embodiment reduces the access latency to the synchronized data by providing immediate access to higher priority data that has finished the synchronization process, and then providing access to lower priority synchronized data received in the background.

In one embodiment the modified set of synchronization rules are transmitted from the mobile terminal to the target computer, wherein the target computer uses the modified set of synchronization rules to configure a synchronization program executed by the target computer. In an alternative embodiment, the mobile terminal processes the modified set of synchronization rules to control the exchange of synchronization data between the mobile terminal and the target computer.

Figure 4C:
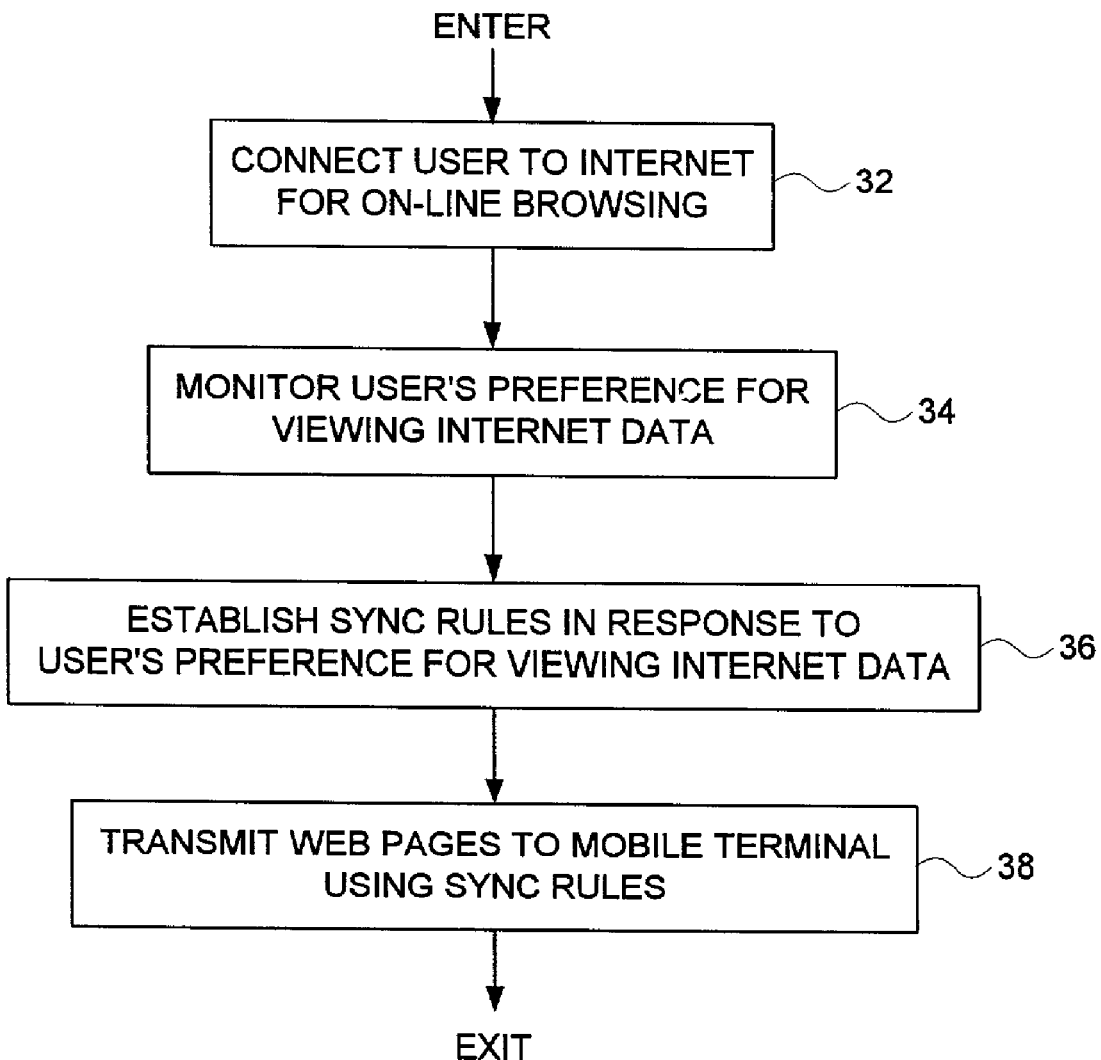
FIG. 4C is a flow chart according to an embodiment of the present invention illustrating how the user's preference in viewing Internet data is monitored in order to adapt the synchronization rules and optimize the synchronization process.

FIG. 4C is a flow chart according to an embodiment of the present invention illustrating a method of remotely synchronizing a mobile terminal to a target computer. At step 32 a user is connected to the Internet for an on-line browsing session. At step 34 the user's progression through a path of linked web pages is monitored while browsing the Internet web site. At step 36 a set of synchronization rules are established based on the user's progression through the path of linked web pages. At step 38 a plurality of web pages associated with the user's path through Internet web site are received by the mobile terminal using the synchronization rules.

Figure 5:
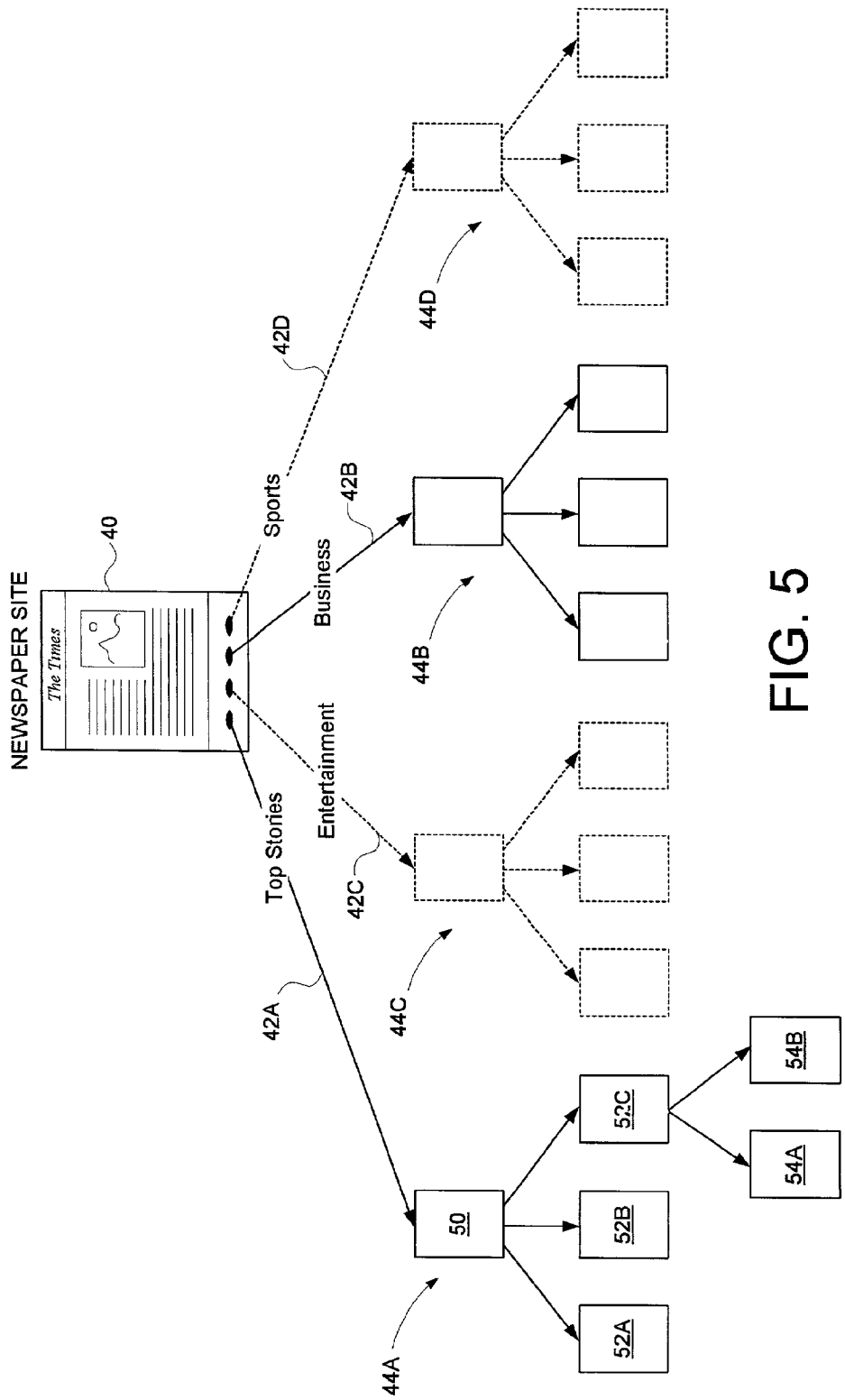
FIG. 5 shows a newspaper web site wherein a user may prefer to only read the Top Stories and the Business articles, therefore in one embodiment the present invention monitors the user's progression through the path of linked web pages while browsing the web site, and modifies the synchronization rules to download the web pages associated with the user's selected path.

FIG. 5 shows a newspaper web site 40 which illustrates this embodiment. In this example, the user prefers only to browse through the web pages comprising the Top Stories and the Business articles. The synchronization rules are therefore modified so that during a synchronization session the Top Stories link 42A and the Business link 42B are followed in order to download the linked pages 44A and 44B to the mobile terminal. The Entertainment link 42C and the Sports link 42D are not followed so that the linked pages 44C and 44D are not downloaded to the mobile terminal. Downloading only the web pages of interest as gleaned from the user's previous browsing sessions filters the amount of data transmitted to the mobile terminal, thereby reducing the synchronization time and cost as well as conserving battery power and storage capacity.

In one embodiment, the user's browsing sessions are monitored on a computer separate from the mobile terminal (e.g., on the target computer) in order to establish the synchronization rules. In another embodiment, the user's browsing session is monitored on the mobile terminal, either while connected directly to the Internet, or while browsing web pages off-line transmitted to the mobile terminal during a synchronization session. In one embodiment, the browsing application may be configured by the user to begin the monitoring process and thereby establish the synchronization rules. In an alternative embodiment, the browsing application comprises an adaptation algorithm for adapting the synchronization rules based on the browsing patterns of the user.

Figure 4D:
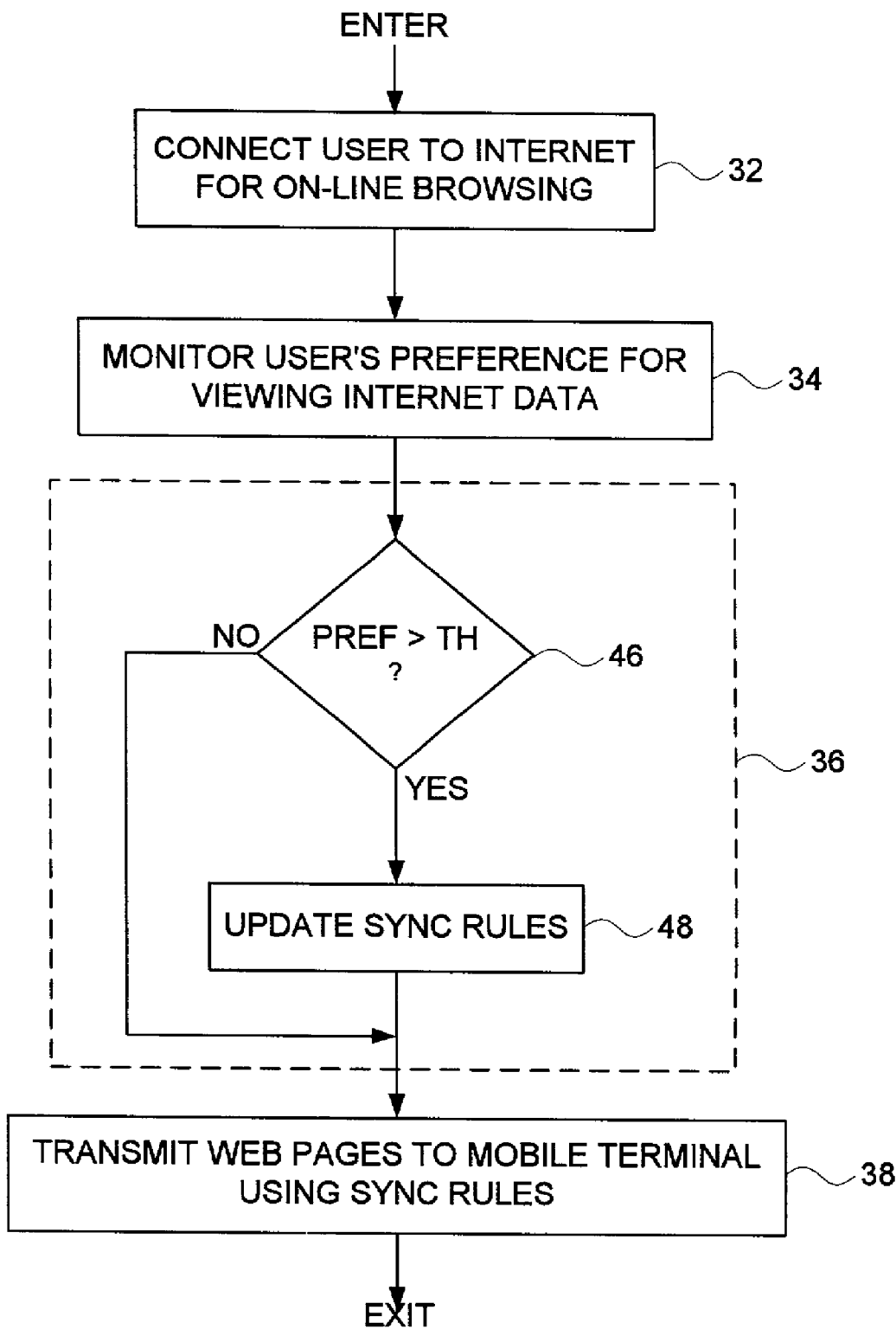
FIG. 4D is a flow chart according to an embodiment of the present invention wherein the synchronization rules are updated if the user repeats an Internet browsing operation a predetermined number of times.

In one embodiment, as shown in the flow chart of FIG. 4D, the synchronization rules are updated if the user repeats a browsing operation a predetermined number of times (e.g., N out of M times). Step 36 of FIG. 4C comprises step 46 and 48 of FIG. 4D. If at step 46 the user's browsing pattern exceeds some predetermined threshold, then at step 48 the computer program updates the synchronization rules to reflect the user's preference. For example, if the user's browsing pattern of a particular web site is the same 9 out of 10 browsing sessions, then the synchronization rules are updated so that the path the user selected during the 9 browsing sessions is the path synchronized during subsequent synchronization sessions.

In one embodiment, the plurality of web pages transmitted to the mobile terminal comprises web pages linked to the path. This is illustrated with reference to FIG. 5 wherein the user may select the Top Stories link 42A in order to display web page 50 during a browsing session. In addition to downloading web page 50, the synchronization rules may be modified such that web pages linked to web page 50 (e.g., web pages 52A, 52B and 52C) are also downloaded during the synchronization session. In one embodiment the synchronization rules are modified so as to comprise a "link-depth" identifying a maximum depth of linked pages extending from the path to include in the plurality of web pages transmitted to the mobile terminal. Referring again to FIG. 5, if the user's browsing path ends with web page 50 and a "link-depth" of 1 is specified, then web page 52C is selected for downloading during synchronization sessions, but not web pages 54A and 54B.

In still another embodiment, the step of monitoring a user's operation of the mobile terminal comprises the step of identifying data of interest to the user, wherein the synchronization rules are adapted so that web pages related to the data of interest are received by the mobile terminal during a synchronization session. For example, if the user frequently downloads web pages comprising information about a particular stock, the synchronization rules may be adapted so that other web pages related to the stock are downloaded during a synchronization session. In one embodiment, an agent running on the target computer evaluates the synchronization rules received from the mobile terminal to determine the data of interest to the user. The agent then searches the Internet for web pages comprising the data of interest (e.g., web pages comprising information about a particular stock).

Figure 6A:
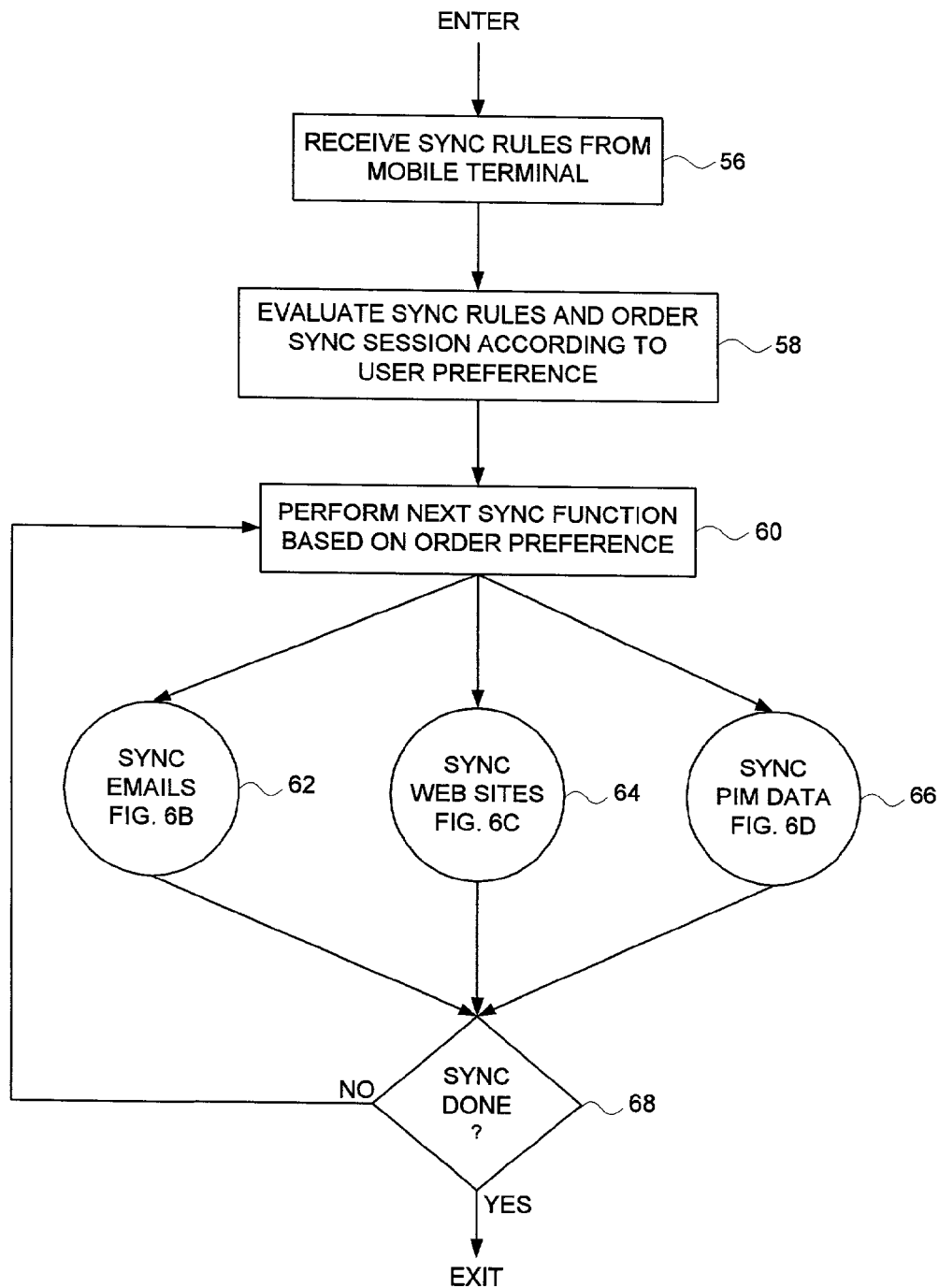
FIG. 6A is a flow chart according to an embodiment of the present invention illustrating how the synchronization rules generated from the user's preferences may be used to synchronize various sets of information, such as emails, web sites, and personal information management (AIM) data.

FIG. 6A is a flow chart according to an embodiment of the present invention illustrating how the synchronization rules generated from the user's preferences may be used to synchronize various sets of information, such as emails, web sites, and personal information management (PIM) data. In the example of FIG. 6A the flow chart is implemented by the target computer; however, in an alternative embodiment the flow chart is implemented by the mobile terminal. At step 56 the target computer receives the synchronization rules from the mobile terminal that have been adapted to the user's preferences for ordering and filtering the synchronization data. At step 58 the target computer evaluates the synchronization rules and orders the synchronization session according to the user's preferences. At step 60 the target computer performs the next synchronization function based on the order preference, wherein in this example the synchronization functions include synchronizing emails 62, web sites 64, and PIM data 66. In one embodiment, the user's preference for viewing and/or manipulating the synchronized data determines the order in which the synchronization functions are performed. For example, if the user prefers to read emails first, the synchronizing of emails 62 is performed first. After synchronizing the emails 62, at step 68 the synchronization session branches back to step 60 to perform the next synchronization function.

Figure 6B:
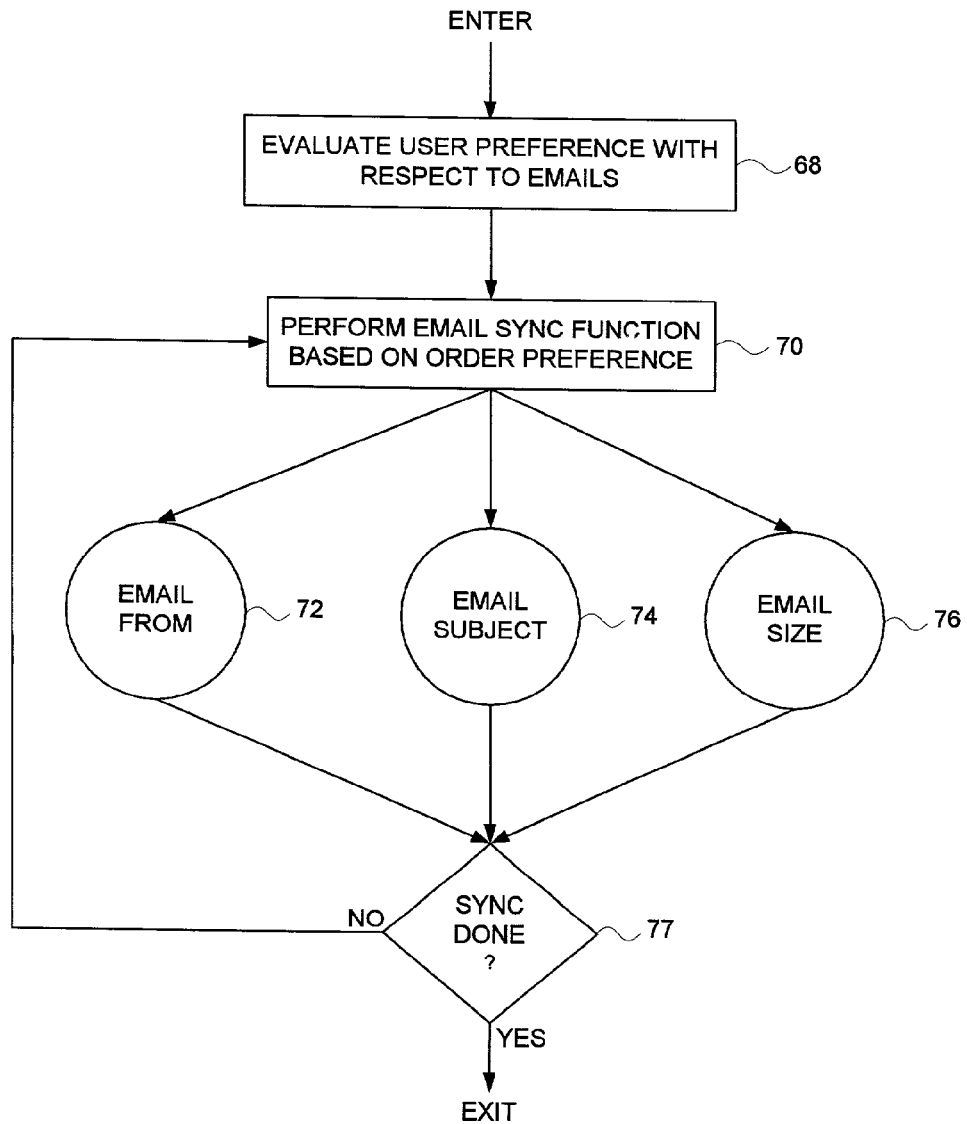
FIG. 6B is a flow chart according to an embodiment of the present invention illustrating how the synchronization rules generated from the user's preferences may be used to order and filter emails.

FIG. 6B is a flow chart according to an embodiment of the present invention illustrating how the synchronization rules generated from the user's preferences may be used to order and filter emails. At step 68 the target computer evaluates the user's preference with respect to emails to configure the email synchronization function. At step 70 the target computer performs the next email synchronization function based on the order preference, wherein in this example the email synchronization functions include synchronizing emails relative to who the email is from 72, synchronizing emails relative to the subject 74, and synchronizing emails relative to their size 76. For example, while viewing emails on the mobile terminal the user may prefer to read emails from a particular sender first, then emails comprising key words within the subject field, and then the remaining emails. Further, the emails may be ordered within each synchronization function. For example, emails from particular senders may be giving higher priority and therefore sent before emails from other senders. Similarly, the emails by subject may be ordered relative to the user's preference in viewing the emails. The remaining emails may be ordered by size such that smaller emails are sent first. Synchronizing the emails continues at step 77 until all of the emails have been synchronized between the mobile terminal and target PC.

In addition to ordering the emails, the synchronization functions may filter the emails based on the user's preference in viewing the emails. For example, if the user typically deletes an email without reading it, or spends only a few seconds reading it, the synchronization rules may be adapted so that similar emails are not transmitted to the mobile terminal during the next synchronization session. These emails may be identified and filtered based on who sent the email, or key words within the subject field or body of the email. In one embodiment, filtered emails that are not transmitted during a remote synchronization session are transmitted during a local synchronization session when the connection bandwidth is higher and connection fees are lower.

Figure 6C:
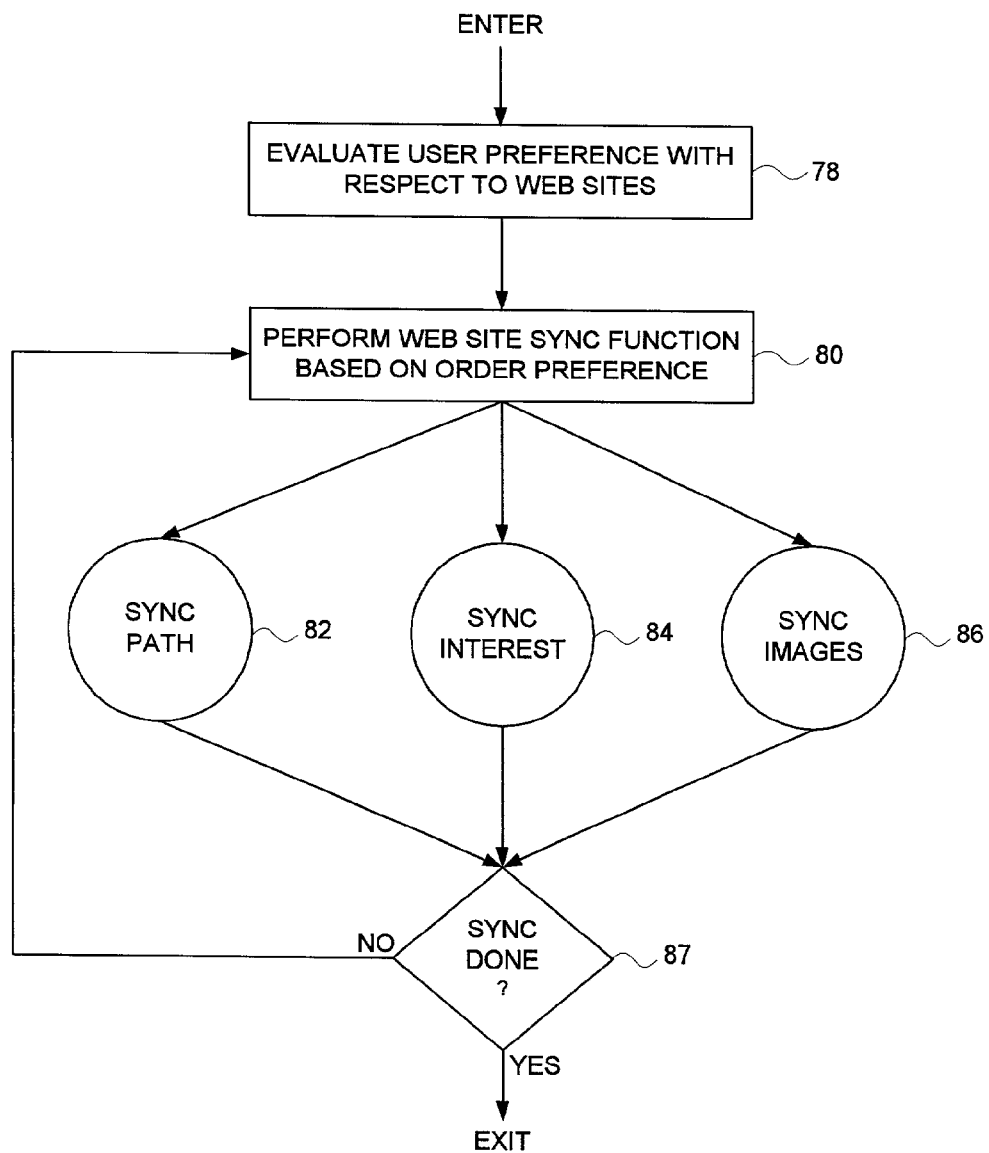
FIG. 6C is a flow chart according to an embodiment of the present invention illustrating how the synchronization rules generated from the user's preferences may be used to order and filter web sites.

FIG. 6C is a flow chart according to an embodiment of the present invention illustrating how the synchronization rules generated from the user's preferences may be used to order and filter web sites. At step 78 the target computer evaluates the user's preference with respect to web sites to configure the web sites synchronization function. For example, the user may prefer to view web sites in a particular order as well the pages within a web site. At step 80 the target computer performs the next web site synchronization function based on the order preference, wherein in this example the web site synchronization functions include synchronizing to web pages associated with a predetermined path through a web site 82, synchronizing to web pages comprising data of interest to the user 84, and synchronizing images 86 within web pages of a web site. As described above with reference to FIG. 5, the path may be determined by monitoring the user's prior browsing patterns through a particular web site. The data of interest to the user may be determined by searching for web pages comprising key words or phrases typically viewed by the user. Because image files are typically large, synchronizing the images within the web pages may be deferred until after synchronizing to the predetermined path through the web site and/or to web pages comprising data of interest. Further, the images may be synchronized by size so that the smaller images are synchronized first. Synchronizing the web sites continues at step 87 until all of the web sites have been synchronized between the mobile terminal and target PC.

Figure 6D:
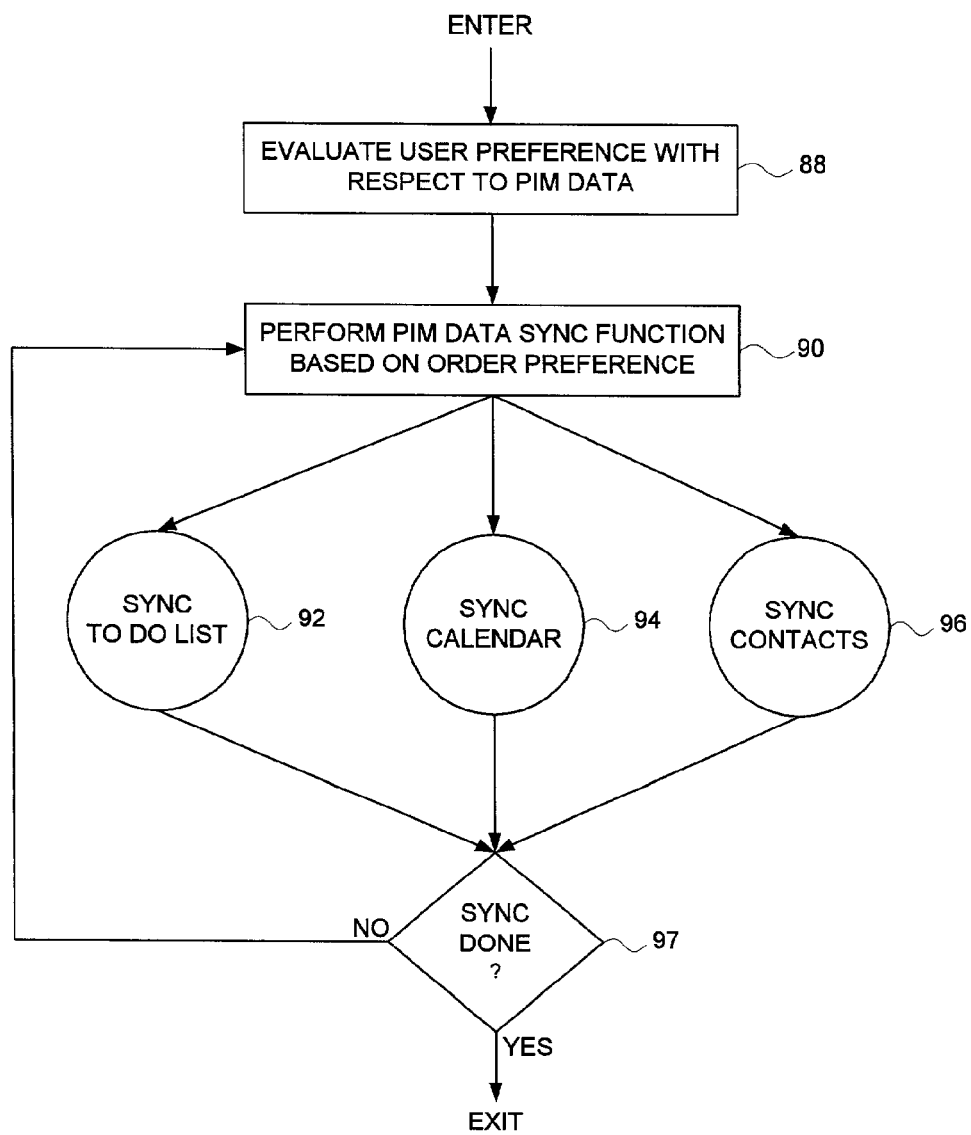
FIG. 6D is a flow chart according to an embodiment of the present invention illustrating how the synchronization rules generated from the user's preferences may be used to order and filter PIM data.

FIG. 6D is a flow chart according to an embodiment of the present invention illustrating how the synchronization rules generated from the user's preferences may be used to order and filter personal information management (PIM) data. At step 88 the target computer evaluates the user's preference with respect to the PIM data to configure the synchronization function. At step 90 the target computer performs the next PIM data synchronization function based on the order preference, wherein in this example the PIM data synchronization functions include synchronizing a to do list 92, synchronizing a calendar 94, and synchronizing a contacts database 96. If the user prefers to view entries in the to do list before viewing entries of the calendar, as determined from user's operation of the mobile terminal, then the to do list is synchronized first. Synchronizing the PIM data continues at step 97 until all of the PIM data has been synchronized between the mobile terminal and target PC.

In one embodiment the synchronization functions filter the synchronization data relative to the difference between the data stored on the mobile terminal and the data stored (or synchronized by) the target computer. For example, when synchronizing to the web pages of a web site, only web pages that have been updated are transmitted to the mobile terminal. In one embodiment, the entire web page is transmitted to the mobile terminal, and in another embodiment, only the updates to a web page are transmitted to the mobile terminal. In one embodiment updated web pages are identified by evaluating a modification date for the web page, and in another embodiment, a modification tag (such as a modification date) is embedded within the web page to identify updated content. Similarly, only new or updated emails as well as new or updated PIM data are exchanged between the target computer and mobile terminal.

In one embodiment, the ordering and filtering rules are adapted relative to a cached status of web pages synchronized to the mobile terminal. The above referenced co-pending patent application entitled "MODIFYING WEB PAGE LINKS FOR DISPLAY ON A MOBILE TERMINAL TO INDICATE THE CACHE STATUS OF LINKED WEB PAGES" discloses a method for displaying links on the mobile terminal relative to the cached status of the web pages identified by the links. In one embodiment of the invention disclosed therein, the cached status indicates a percentage of a web site currently synchronized with the mobile terminal. In one embodiment of the present invention, the ordering and filtering rules are adapted so that web sites already substantially synchronized with the mobile terminal are synchronized with higher priority. These web sites will be synchronized quickly, thereby allowing the user to view the web sites soon after the synchronization session begins.

Figure 7A:
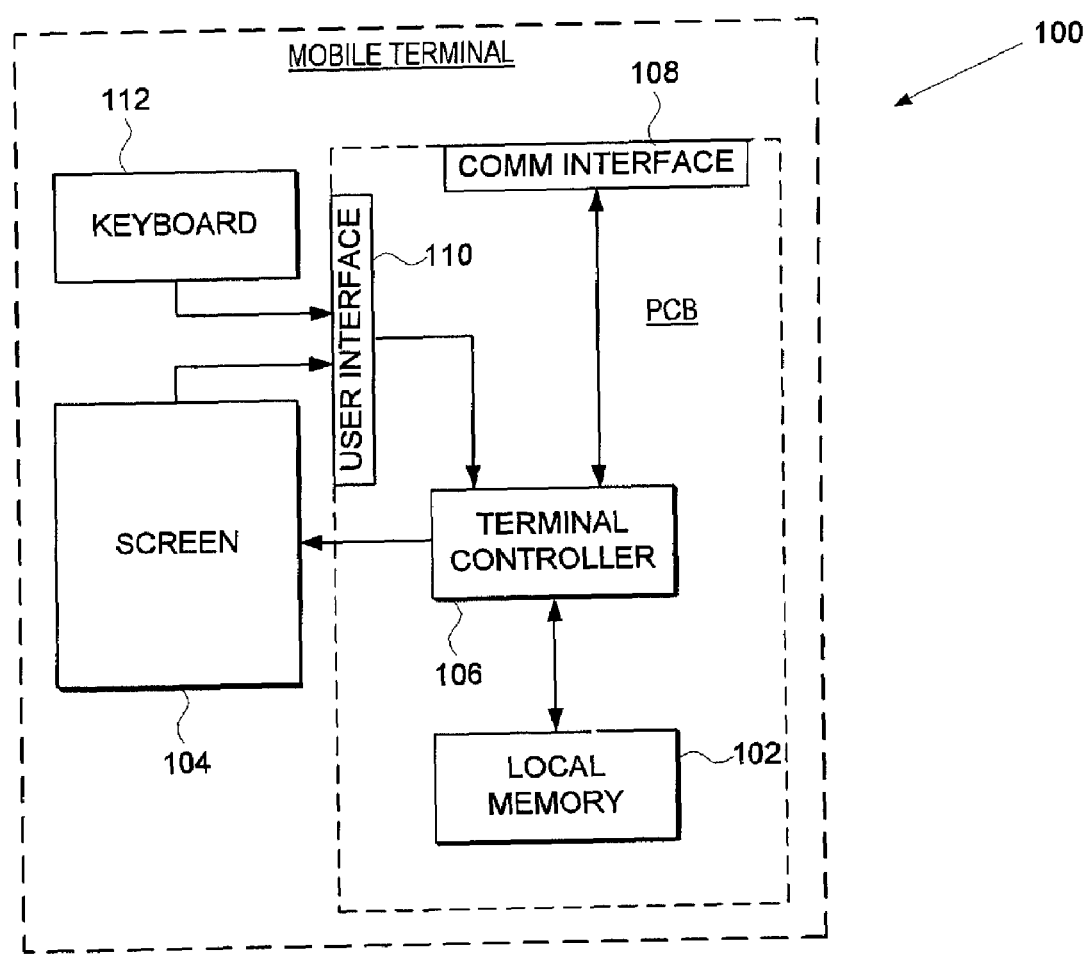
FIG. 7A shows a mobile terminal according to an embodiment of the present invention comprising a terminal controller for executing a computer program for adapting the synchronization rules in response to the user's operation of the mobile terminal.

FIG. 7A shows a mobile terminal 100 for communicating with a target computer according to an embodiment of the present invention. The mobile terminal 100 comprises a local memory 102 for storing a set of synchronization rules comprising ordering and filtering rules. The mobile terminal 100 further comprises a screen 104 and a terminal controller 106. The terminal controller 106 is for monitoring a user's operation of the mobile terminal 100, and executing a computer program for adapting the ordering and filtering rules in response to the user's operation of the mobile terminal 100 to generate a modified set of synchronization rules. The terminal controller 106 uses the modified set of synchronization rules to exchange synchronization data between the target computer and the mobile terminal 100, and store synchronized data in the local memory. In the embodiment of FIG. 7A, the mobile terminal 100 further comprises a communication interface 108 for communicating with the target computer, and a user interface 110 for receiving user input from a keyboard 112 as well as the screen 104.

Figure 7B:
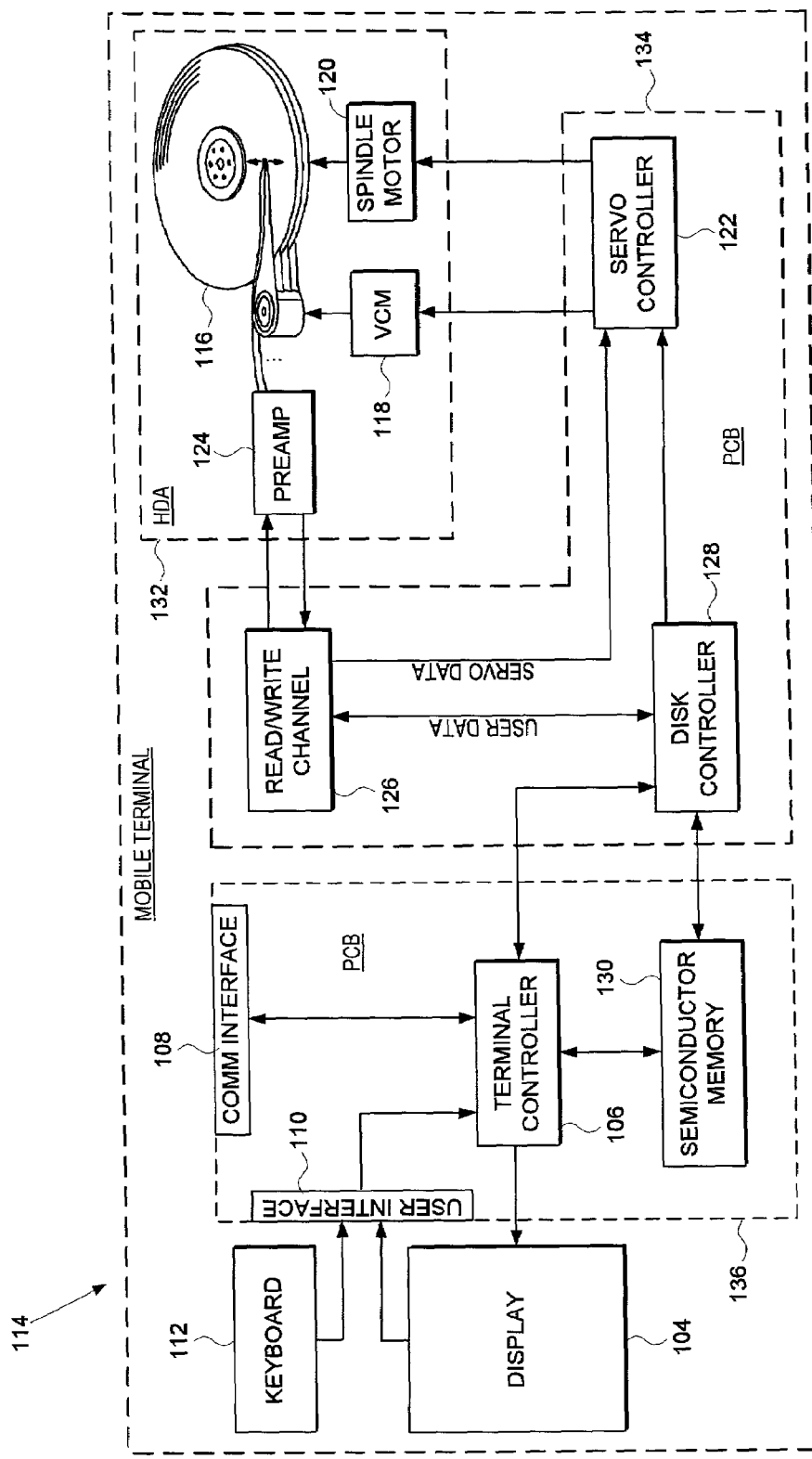
FIG. 7B shows a mobile terminal according to an embodiment of the present invention comprising a disk for non-volatile storage of the synchronized data.

FIG. 7B shows a mobile terminal 114 according to an embodiment of the present invention wherein the local memory comprises a disk 116. The mobile terminal 114 further comprises components for enabling the disk storage, including a voice coil motor (VCM) 118 and spindle motor 120, a servo controller 122, a preamp 124, a read/write channel 126, and a disk controller 128. In the embodiment of FIG. 7B, the mobile terminal 114 comprises semiconductor memory 130 that is shared by the terminal controller 106 and disk controller 128 to reduce the cost of the mobile terminal 114. In another embodiment, the terminal controller 106 executes a disk caching algorithm for caching data read from and written to the disk 116. In the embodiment of FIG. 7B, the disk 116, VCM 118, spindle motor 120 and preamp 124 are implemented within a head disk assembly (HDA) 132, the servo controller 122, read/write channel 126 and disk controller 128 are implemented on a first printed circuit board (PCB) 134, and the terminal controller 106 and semiconductor memory 130 are implemented on a second PCB 136. In an alternative embodiment, the servo controller 122, read/write channel 126, disk controller 128, terminal controller 106, and semiconductor memory 130 are implemented on a single PCB.

In one embodiment, the local memory of the mobile terminal (e.g., the disk 116 in FIG. 7B) stores a computer program comprising code segments for monitoring a user's operation of the mobile terminal, adapting the ordering and filtering rules in response to the user's operation of the mobile terminal to generate a modified set of synchronization rules, exchanging synchronization data between a target computer and the mobile terminal using the modified set of synchronization rules, and storing synchronized data in the local memory of the mobile terminal.

We claim:

1. A method of remotely synchronizing a mobile terminal to a target computer, the mobile terminal comprising a local memory and a screen, the method comprising the steps of:
   (a) providing a set of synchronization rules comprising ordering and filtering rules;
   (b) monitoring a user's operation of the mobile terminal;
   (c) executing a computer program for adapting the ordering and filtering rules in response to the user's operation of the mobile terminal to generate a modified set of synchronization rules; and
   (d) exchanging synchronization data between the target computer and the mobile terminal using the modified set of synchronization rules, and storing synchronized data in the local memory of the mobile terminal, wherein
      the synchronization data comprises a first data and a second data;
      the step of monitoring a user's operation of the mobile terminal comprises the step of monitoring the user's preference in viewing data; and
      if the step of monitoring the user's operation indicates a preference for viewing the first data before viewing the second data, the computer program adapts the ordering and filtering rules such that the first data are received by the mobile terminal before the second data.

2. The method as recited in claim 1, further comprising the step of displaying the synchronized data on the screen of the mobile terminal while concurrently receiving synchronization data from the target computer using the modified set of synchronization rules.

3. The method as recited in claim 1, further comprising the step of transmitting the modified set of synchronization rules from the mobile terminal to the target computer.

4. The method as recited in claim 2, further comprising the step of transmitting the modified set of synchronization rules from the mobile terminal to the target computer.

5. The method as recited in claim 3, wherein the target computer uses the modified set of synchronization rules to configure a synchronization program executed by the target computer.

6. The method as recited in claim 4, wherein the target computer uses the modified set of synchronization rules to configure a synchronization program executed by the target computer.

7. The method as recited in claim 1, wherein the mobile terminal processes the modified set of synchronization rules to control the exchange of synchronization data between the mobile terminal and the target computer.

8. The method as recited in claim 1, wherein the first data comprises emails and the second data comprises web pages.

9. The method as recited in claim 1, wherein the first data comprises a first web page and the second data comprises a second web page.

10. The method as recited in claim 1, wherein:
(a) the step of monitoring a user's operation of the mobile terminal comprises the step of identifying data of interest to the user; and
(b) the computer program adapts the ordering and filtering rules so that web pages related to the data of interest are received by the mobile terminal.

11. The method as recited in claim 1, further comprising the steps of:
(a) monitoring the user's progression through a path of linked web pages while browsing an Internet web site on-line;
(b) adapting the ordering and filtering rules based on the user's progression through the path of linked web pages; and
(c) receiving a plurality of web pages associated with the path, the web pages for display on the screen of the mobile terminal.

12. The method as recited in claim 11, wherein the plurality of web pages received by the mobile terminal comprise web pages linked to the path.

13. The method as recited in claim 12, wherein the synchronization rules comprise a link-depth identifying a maximum depth of linked pages extending from the path to include in the plurality of web pages received by the mobile terminal.

14. The method as recited in claim 11, further comprising the steps of:
(a) the user enabling the monitoring of the progression through the path of linked web pages; and
(b) the user disabling the monitoring of the progression through the path of linked web pages.

15. A mobile terminal for communicating with a target computer, the mobile terminal comprising:
(a) a local memory for storing a set of synchronization rules comprising ordering and filtering rules;
(b) a screen;
(c) a terminal controller for:
monitoring a user's operation of the mobile terminal;
executing a computer program for adapting the ordering and filtering rules in response to the user's operation of the mobile terminal to generate a modified set of synchronization rules; and
exchanging synchronization data between the target computer and the mobile terminal using the modified set of synchronization rules, and storing synchronized data in the local memory.

16. The mobile terminal as recited in claim 15, wherein the terminal controller for displaying the synchronized data on the screen of the mobile terminal while concurrently receiving synchronization data from the target computer using the modified set of synchronization rules.

17. The mobile terminal as recited in claim 15, further comprising the step of transmitting the modified set of synchronization rules from the mobile terminal to the target computer.

18. The mobile terminal as recited in claim 16, further comprising the step of transmitting the modified set of synchronization rules from the mobile terminal to the target computer.

19. The mobile terminal as recited in claim 17, wherein the target computer uses the modified set of synchronization rules to configure a synchronization program executed by the target computer.

20. The mobile terminal as recited in claim 18, wherein the target computer uses the modified set of synchronization rules to configure a synchronization program executed by the target computer.

21. The mobile terminal as recited in claim 15, wherein the terminal controller for processing the modified set of synchronization rules to control the exchange of synchronization data between the mobile terminal and the target computer.

22. The mobile terminal as recited in claim 15, wherein:
(a) the synchronization data comprises a first data and a second data;
(b) the terminal controller for monitoring the user's preference in viewing data; and
(c) if monitoring the user's preference in viewing data indicates a preference for viewing the first data before viewing the second data, the computer program adapts the ordering and filtering rules so that the first data are received by the mobile terminal before the second data.

23. The mobile terminal as recited in claim 22, wherein the first data comprises emails and the second data comprises web pages.

24. The mobile terminal as recited in claim 22, wherein the first data comprises a first web page and the second data comprises a second web page.

25. The mobile terminal as recited in claim 15, wherein:
(a) the terminal controller for identifying data of interest to the user based on the user's operation of the mobile terminal; and
(b) the computer program adapts the synchronization rules so that web pages related to the data of interest are downloaded to the mobile terminal.

26. The mobile terminal as recited in claim 15, wherein:
(a) the terminal controller for monitoring the user's progression through a path of linked web pages while browsing an Internet web site on-line;
(b) the computer program for adapting the ordering and filtering rules based on the user's progression through the path of linked web pages; and
(c) the terminal controller for receiving a plurality of web pages associated with the path, and for displaying the web pages on the screen of the mobile terminal.

27. The mobile terminal as recited in claim 26, wherein the plurality of web pages received by the mobile terminal comprises web pages linked to the path.

28. The mobile terminal as recited in claim 27, wherein the synchronization rules comprise a link-depth identifying a maximum depth of linked pages extending from the path to include in the plurality of web pages received by the mobile terminal.

29. The mobile terminal as recited in claim 26, wherein:
(a) the user enables the monitoring of the progression through the path of linked web pages; and
(b) the user disables the monitoring of the progression through the path of linked web pages.

30. A computer program embodied on a computer readable storage medium for use in a mobile terminal, the mobile terminal comprising a local memory, a screen, and a set of synchronization rules comprising ordering and filtering rules, the computer program comprising code segments for:
(a) monitoring a user's operation of the mobile terminal;
(b) adapting the ordering and filtering rules in response to the user's operation of the mobile terminal to generate a modified set of synchronization rules; and (c) exchanging synchronization data between the target computer and the mobile terminal using the modified set of synchronization rules, and storing synchronized data in the local memory of the mobile terminal, wherein the synchronization data comprises a first data and a second data;

(d) monitoring the user's preference in viewing data; and (e) if monitoring the user's preference in viewing data indicates a preference for viewing the first data before viewing the second data, adapting the ordering and filtering such that the first data are received by the mobile terminal before the second data.

31. The computer program as recited in claim 30, further comprising code segments for displaying the synchronized data on the screen of the mobile terminal while concurrently receiving synchronization data from the target computer using the modified set of synchronization rules.

32. The computer program as recited in claim 30, further comprising a code segment for transmitting the modified set of synchronization rules from the mobile terminal to the target computer.

33. The computer program as recited in claim 31, further comprising a code segment for transmitting the modified set of synchronization rules from the mobile terminal to the target computer.

34. The computer program as recited in claim 32, wherein the target computer uses the modified set of synchronization rules to configure a synchronization program executed by the target computer.

35. The computer program as recited in claim 33, wherein the target computer uses the modified set of synchronization rules to configure a synchronization program executed by the target computer.

36. The computer program as recited in claim 30, further comprising a code segment for processing the modified set of synchronization rules to control the exchange of synchronization data between the mobile terminal and the target computer.

37. The computer program as recited in claim 30, wherein the first data comprises emails and the second data comprises web pages.

38. The computer program as recited in claim 30, wherein the first data comprises a first web page and the second data comprises a second web page.

39. The computer program as recited in claim 30, further comprising code segments for:

(a) identifying data of interest to the user based on the user's operation of the mobile terminal; and (b) adapting the ordering and filtering rules so that web pages related to the data of interest are received by the mobile terminal.

40. The computer program as recited in claim 30, further comprising code segments for:

(a) monitoring the user's progression through a path of linked web pages while browsing an Internet web site on-line;

(b) adapting the ordering and filtering rules based on the user's progression through the path of linked web pages; and (c) receiving a plurality of web pages associated with the path, the web pages for display on the screen of the mobile terminal.

41. The computer program as recited in claim 40, wherein the plurality of web pages received by the mobile terminal comprise web pages linked to the path.

42. The computer program as recited in claim 41, wherein the synchronization rules comprise a link-depth identifying a maximum depth of linked pages extending from the path to include in the plurality of web pages received by the mobile terminal.

43. The computer program as recited in claim 40, wherein:

(a) the user enables the monitoring of the progression through the path of linked web pages; and (b) the user disables the monitoring of the progression through the path of linked web pages.

* * * * *